(12) United States Patent
Kumar

(10) Patent No.: US 9,120,703 B2
(45) Date of Patent: Sep. 1, 2015

(54) MOUNTING MAT AND EXHAUST GAS TREATMENT DEVICE

(75) Inventor: Amit Kumar, Getzville, NY (US)

(73) Assignee: UNIFRAX I LLC, Tonawanda, NY (US)

( * ) Notice: Subject to any disclaimer, the term of this patent is extended or adjusted under 35 U.S.C. 154(b) by 281 days.

(21) Appl. No.: 13/294,328

(22) Filed: Nov. 11, 2011

(65) Prior Publication Data

US 2012/0121473 A1   May 17, 2012

Related U.S. Application Data

(60) Provisional application No. 61/412,452, filed on Nov. 11, 2010.

(51) Int. Cl.
*C04B 30/02* (2006.01)
*F01N 3/28* (2006.01)

(52) U.S. Cl.
CPC ............. *C04B 30/02* (2013.01); *F01N 3/2853* (2013.01); *Y10T 29/49826* (2015.01); *Y10T 156/10* (2015.01)

(58) Field of Classification Search
CPC . F01N 3/2853; Y10T 156/10; C04B 14/4656; C04B 30/02; C04B 14/4625
USPC .......................................... 422/177, 179, 180
See application file for complete search history.

(56) References Cited

U.S. PATENT DOCUMENTS

| | | |
|---|---|---|
| 2,624,658 A | 1/1953 | Parker et al. |
| 3,012,923 A | 12/1961 | Slayter |
| 3,458,329 A | 7/1969 | Owens et al. |
| 3,510,394 A | 5/1970 | Cadotte |
| 3,649,406 A | 3/1972 | McNish |
| 3,674,621 A | 7/1972 | Miyamoto et al. |
| 3,771,967 A | 11/1973 | Nowak |
| 3,798,006 A | 3/1974 | Balluff |
| 3,916,057 A | 10/1975 | Hatch et al. |

(Continued)

FOREIGN PATENT DOCUMENTS

| | | |
|---|---|---|
| CN | 101688459 A | 3/2010 |
| DE | 3925845 | 2/1991 |

(Continued)

OTHER PUBLICATIONS

Gulati, Ten Eyck & Lebold; "Durable Packaging Design for Cordierite Ceramic Catalysts for Motorcycle Application"; Society of Automotive Engineers Meeting; Mar. 1, 1993; Detroit, MI.

(Continued)

*Primary Examiner* — Tom P Duong
(74) *Attorney, Agent, or Firm* — Curatolo Sidoti Co., LPA; Joseph G. Curatolo; Salvatore A. Sidoti

(57) ABSTRACT

A mounting mat for mounting a catalyst support structure within a housing in an exhaust gas treatment device. The mounting mat includes a layer of high silica content fibers and a layer of polycrystalline and/or high alumina inorganic fibers. The exhaust gas treatment device includes an outer housing, a fragile catalyst, and a mounting mat disposed in the gap between the housing and the fragile catalyst support structure. Additionally disclosed are methods of making the mounting mat and for making an exhaust gas treatment device incorporating the mounting mat.

44 Claims, 1 Drawing Sheet

(56) References Cited

U.S. PATENT DOCUMENTS

| | | |
|---|---|---|
| 3,957,573 A | 5/1976 | Miyamoto et al. |
| 3,996,145 A | 12/1976 | Hepburn |
| 4,011,651 A | 3/1977 | Bradbury et al. |
| 4,048,363 A | 9/1977 | Langer et al. |
| 4,093,423 A | 6/1978 | Neumann |
| 4,101,280 A | 7/1978 | Frietzsche et al. |
| 4,142,864 A | 3/1979 | Rosynsky et al. |
| 4,156,533 A | 5/1979 | Close et al. |
| 4,159,205 A | 6/1979 | Miyahara et al. |
| 4,204,907 A | 5/1980 | Korklan et al. |
| 4,239,733 A | 12/1980 | Foster et al. |
| 4,269,807 A | 5/1981 | Bailey et al. |
| 4,269,887 A | 5/1981 | Sonobe et al. |
| 4,271,228 A | 6/1981 | Foster et al. |
| 4,277,269 A | 7/1981 | Sweeting |
| 4,279,864 A | 7/1981 | Nara et al. |
| 4,305,992 A | 12/1981 | Langer et al. |
| 4,328,187 A | 5/1982 | Musall et al. |
| 4,332,852 A | 6/1982 | Korklan et al. |
| 4,335,077 A | 6/1982 | Santiago et al. |
| 4,353,872 A | 10/1982 | Midorikawa |
| 4,385,135 A | 5/1983 | Langer et al. |
| 4,447,345 A | 5/1984 | Kummermehr et al. |
| 4,617,176 A | 10/1986 | Merry |
| 4,693,338 A | 9/1987 | Clerc |
| 4,746,570 A | 5/1988 | Suzaki et al. |
| 4,752,515 A | 6/1988 | Hosoi et al. |
| 4,797,263 A | 1/1989 | Oza |
| 4,823,845 A | 4/1989 | Martin et al. |
| 4,849,382 A | 7/1989 | Shibata et al. |
| 4,863,700 A | 9/1989 | Ten Eyck |
| 4,865,818 A | 9/1989 | Merry et al. |
| 4,927,608 A | 5/1990 | Wörner et al. |
| 4,929,429 A | 5/1990 | Merry |
| 4,985,212 A | 1/1991 | Kawakami et al. |
| 4,999,168 A | 3/1991 | Ten Eyck |
| 5,002,836 A | 3/1991 | Dinwoodie et al. |
| 5,008,086 A | 4/1991 | Merry |
| 5,032,441 A | 7/1991 | Ten Eyck et al. |
| 5,073,432 A | 12/1991 | Horikawa et al. |
| 5,079,280 A | 1/1992 | Yang et al. |
| 5,094,073 A | 3/1992 | Wörner et al. |
| 5,094,074 A | 3/1992 | Nishizawa et al. |
| 5,104,713 A | 4/1992 | Hosoi et al. |
| 5,119,551 A | 6/1992 | Abbott |
| 5,139,615 A | 8/1992 | Conner et al. |
| 5,145,811 A | 9/1992 | Lintz et al. |
| 5,151,253 A | 9/1992 | Merry et al. |
| 5,167,765 A | 12/1992 | Nielsen et al. |
| 5,242,871 A | 9/1993 | Hashimoto et al. |
| 5,250,269 A | 10/1993 | Langer |
| 5,254,410 A | 10/1993 | Langer et al. |
| 5,258,216 A | 11/1993 | Von Bonin et al. |
| 5,290,522 A | 3/1994 | Rogers et al. |
| 5,332,609 A | 7/1994 | Corn |
| 5,340,643 A | 8/1994 | Ou et al. |
| 5,376,341 A | 12/1994 | Gulati |
| 5,380,580 A | 1/1995 | Rogers et al. |
| 5,384,188 A | 1/1995 | Lebold et al. |
| 5,419,975 A | 5/1995 | Lintz et al. |
| 5,453,116 A | 9/1995 | Fischer et al. |
| 5,482,686 A | 1/1996 | Lebold et al. |
| 5,488,826 A | 2/1996 | Paas |
| 5,502,937 A | 4/1996 | Wilson |
| 5,523,059 A | 6/1996 | Langer |
| 5,567,536 A | 10/1996 | Lintz et al. |
| 5,580,532 A | 12/1996 | Robinson et al. |
| 5,666,726 A | 9/1997 | Robinson et al. |
| 5,736,109 A | 4/1998 | Howorth et al. |
| 5,811,063 A | 9/1998 | Robinson et al. |
| 5,853,675 A | 12/1998 | Howorth |
| 5,862,590 A | 1/1999 | Sakashita et al. |
| 5,869,010 A | 2/1999 | Langer |
| 5,882,608 A | 3/1999 | Sanocki et al. |
| 6,000,131 A | 12/1999 | Schmitt |
| 6,051,193 A | 4/2000 | Langer et al. |
| 6,101,714 A | 8/2000 | Schmitt |
| 6,158,120 A | 12/2000 | Foster et al. |
| 6,162,404 A | 12/2000 | Tojo et al. |
| 6,231,818 B1 | 5/2001 | TenEyck |
| 6,251,224 B1 | 6/2001 | Dong |
| 6,267,843 B1 | 7/2001 | Helwig et al. |
| 6,317,976 B1 | 11/2001 | Aranda et al. |
| 6,468,932 B1 | 10/2002 | Robin et al. |
| 6,589,488 B1 | 7/2003 | Eyhorn |
| 6,726,884 B1 | 4/2004 | Dillon et al. |
| 6,733,628 B2 | 5/2004 | Dinwoodie et al. |
| 6,737,146 B2 | 5/2004 | Schierz et al. |
| 6,756,107 B1 | 6/2004 | Schierz et al. |
| 6,855,298 B2 | 2/2005 | Ten Eyck |
| 6,923,942 B1 | 8/2005 | Shirk et al. |
| 7,033,412 B2 | 4/2006 | Kumar et al. |
| 7,153,796 B2 | 12/2006 | Jubb et al. |
| 7,160,503 B2 | 1/2007 | Weaver |
| 7,261,864 B2 | 8/2007 | Watanabe |
| 7,276,280 B2 | 10/2007 | Dinwoodie et al. |
| 7,387,822 B2 | 6/2008 | Dinwoodie |
| 7,550,118 B2 | 6/2009 | Merry |
| 7,820,117 B2 | 10/2010 | Peisert et al. |
| 7,887,917 B2 | 2/2011 | Zoitos et al. |
| 7,971,357 B2 | 7/2011 | Ten Eyck et al. |
| 8,460,611 B2 | 6/2013 | Yasida |
| 2001/0036427 A1 | 11/2001 | Yamada et al. |
| 2002/0025750 A1 | 2/2002 | Dinwoodie |
| 2002/0025904 A1 | 2/2002 | Goto et al. |
| 2002/0127154 A1 | 9/2002 | Foster et al. |
| 2003/0049180 A1 | 3/2003 | Fukushima |
| 2003/0056861 A1 | 3/2003 | Weaver |
| 2003/0185724 A1 | 10/2003 | Anji et al. |
| 2004/0052694 A1 | 3/2004 | Nishikawa et al. |
| 2004/0134172 A1* | 7/2004 | Kumar et al. .................. 55/523 |
| 2004/0234436 A1 | 11/2004 | Howorth |
| 2005/0272602 A1 | 12/2005 | Ninomiya |
| 2006/0153746 A1 | 7/2006 | Merry et al. |
| 2006/0154040 A1 | 7/2006 | Merry |
| 2006/0257298 A1 | 11/2006 | Merry |
| 2006/0278323 A1 | 12/2006 | Eguchi |
| 2007/0065349 A1 | 3/2007 | Merry |
| 2007/0207069 A1 | 9/2007 | Kariya et al. |
| 2007/0218320 A1 | 9/2007 | Weaver |
| 2008/0206114 A1* | 8/2008 | Hornback ...................... 422/177 |
| 2008/0253939 A1 | 10/2008 | Hornback |
| 2009/0060800 A1* | 3/2009 | Fernandes, Jr. ............... 422/168 |
| 2009/0060802 A1 | 3/2009 | Beauharnois |
| 2009/0114097 A1 | 5/2009 | Saiki |
| 2009/0162256 A1 | 6/2009 | Ten Eyck et al. |
| 2010/0055004 A1 | 3/2010 | Olson et al. |
| 2010/0173552 A1 | 7/2010 | Fernando et al. |
| 2010/0207298 A1 | 8/2010 | Kunze et al. |
| 2010/0209306 A1 | 8/2010 | Kunze et al. |
| 2010/0266462 A1 | 10/2010 | Kumar |
| 2011/0023430 A1 | 2/2011 | Kumar et al. |
| 2011/0033343 A1 | 2/2011 | Fernandes, Jr. |
| 2011/0036063 A1 | 2/2011 | Kumar |
| 2011/0094419 A1 | 4/2011 | Fernando et al. |
| 2011/0097246 A1 | 4/2011 | Beauharnois et al. |
| 2011/0126499 A1 | 6/2011 | Kumar |
| 2011/0150715 A1 | 6/2011 | Kumar |
| 2011/0150717 A1 | 6/2011 | Kumar et al. |
| 2011/0311403 A1 | 12/2011 | Kumar et al. |
| 2012/0100046 A1 | 4/2012 | Kelsall et al. |

FOREIGN PATENT DOCUMENTS

| | | |
|---|---|---|
| DE | 196 38 542 A1 | 3/1997 |
| DE | 1992 29 54 A1 | 11/2000 |
| DE | 199 57 692 A1 | 5/2001 |
| EP | 0 205 704 | 12/1986 |
| EP | 0 279 511 A2 | 8/1988 |
| EP | 0 319 299 A2 | 6/1989 |
| EP | 0 328 293 A1 | 8/1989 |
| EP | 0 396 331 A1 | 11/1990 |
| EP | 0 398 130 A2 | 11/1990 |
| EP | 0 465 203 A1 | 1/1992 |

(56) References Cited

FOREIGN PATENT DOCUMENTS

| | | |
|---|---|---|
| EP | 0 508 751 A1 | 10/1992 |
| EP | 0 551 532 A1 | 7/1993 |
| EP | 0 573 834 A1 | 12/1993 |
| EP | 0 643 204 A2 | 3/1995 |
| EP | 0 765 993 A1 | 4/1997 |
| EP | 0 803 643 A1 | 10/1997 |
| EP | 1 267 048 A1 | 12/2002 |
| EP | 1 183 448 B1 | 12/2004 |
| EP | 1 495 807 A1 | 1/2005 |
| EP | 1 533 409 A1 | 5/2005 |
| EP | 1 696 110 A1 | 8/2006 |
| EP | 1 830 043 A1 | 9/2007 |
| EP | 1 905 895 A1 | 4/2008 |
| EP | 1 950 035 A1 | 7/2008 |
| EP | 1 931 862 B1 | 7/2009 |
| GB | 1 438 762 A | 6/1976 |
| GB | 1 438 784 A | 6/1976 |
| GB | 1 513 808 A | 6/1978 |
| GB | 2 116 476 A | 9/1983 |
| GB | 2 125 458 A | 3/1984 |
| GB | 2 200 129 A | 7/1988 |
| GB | 2 319 247 A | 5/1998 |
| JP | 4-83773 A | 3/1992 |
| JP | 6-272549 | 9/1994 |
| JP | 7-286514 A | 10/1995 |
| JP | 2002266169 A | 9/2002 |
| JP | 2006/177368 A | 7/2006 |
| KR | 2002-00410920 A | 6/2002 |
| WO | WO 91/11498 A1 | 8/1991 |
| WO | WO 93/23245 | 11/1993 |
| WO | WO 94/24425 | 10/1994 |
| WO | WO 97/02413 | 1/1997 |
| WO | WO 97/32118 | 9/1997 |
| WO | WO 97/32118 A1 | 9/1997 |
| WO | WO 98/04404 | 2/1998 |
| WO | WO 99/23370 | 5/1999 |
| WO | WO 99/23370 A1 | 5/1999 |
| WO | WO 99/46028 A1 | 9/1999 |
| WO | WO 00/75496 A1 | 12/2000 |
| WO | WO 01/65008 A1 | 9/2001 |
| WO | WO 01/83956 A1 | 11/2001 |
| WO | WO 02/33233 A1 | 4/2002 |
| WO | WO 02/053511 A1 | 7/2002 |
| WO | WO 03/000414 A1 | 1/2003 |
| WO | WO 03/031368 A2 | 4/2003 |
| WO | WO 2005/106222 | 11/2005 |
| WO | WO 2006/065534 | 6/2006 |
| WO | WO 2007/143437 | 12/2007 |
| WO | WO 2008/059249 | 5/2008 |
| WO | WO 2008/103525 A2 | 8/2008 |
| WO | WO 2008/154078 A1 | 12/2008 |
| WO | WO 2008/156942 A1 | 12/2008 |
| WO | WO 2011/067598 | 6/2011 |

OTHER PUBLICATIONS

Maret, Gulati, Lambert & Zink; "Systems Durability of a Ceramic Racetrack Converter"; International Fuels and Lubricants Meeting; Oct. 7-10, 1991; Toronto, Canada.
International Search Report, Form PCT/ISA/210 mailed Jun. 8, 2012 for PCT International Patent Application No. PCT/US2011/060353.
Written Opinion, Form PCT/ISA/237 mailed Jun. 8, 2012 for PCT International Patent Application No. PCT/US2011/060353.
Excerpt from "Strong Fibres", Handbook of composites, 1985, vol. 1, Elsevier Science Publishers B.V., The Netherlands.
Chinese Office Action mailed on May 27, 2015 for corresponding Chinese application, CN 201180064878.

* cited by examiner

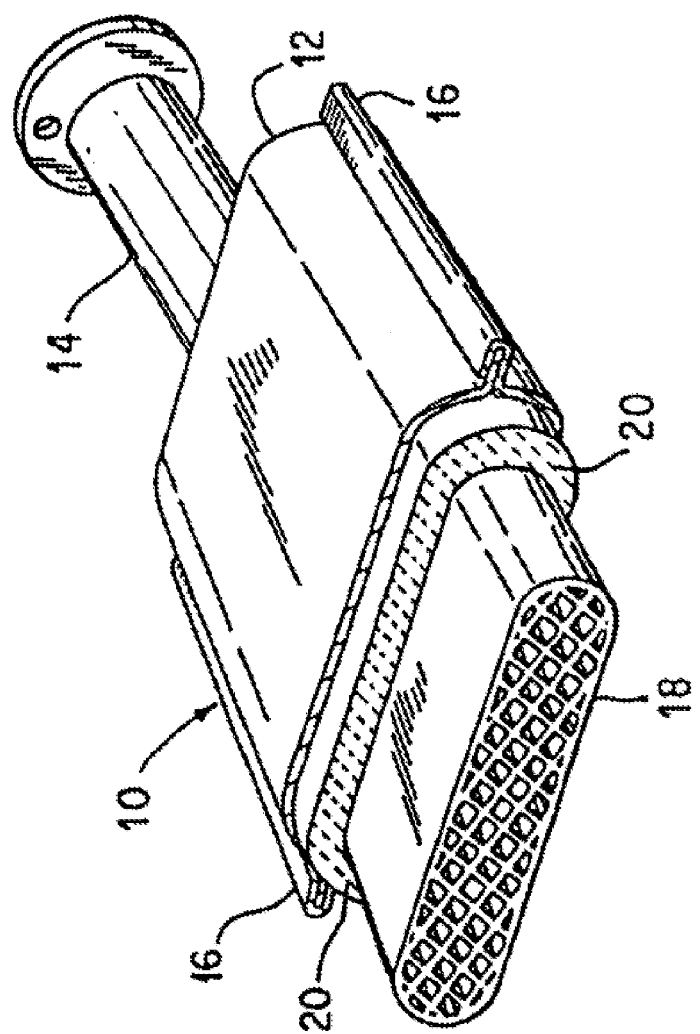

MOUNTING MAT AND EXHAUST GAS TREATMENT DEVICE

This application claims the benefit of the filing date under 35 U.S.C. §119(e) from U.S. Provisional Application for Patent Ser. No. 61/412,452 filed on Nov. 11, 2010.

Disclosed are a mounting mat and an exhaust gas treatment device, such as a catalytic converter or a diesel particulate trap. The exhaust gas treatment device includes a fragile structure that is mounted within a housing by a mounting mat that is disposed in a gap between the housing and the fragile structure.

Exhaust gas treatment devices are used on automobiles to reduce atmospheric pollution from engine emissions. Examples of widely used exhaust gas treatment devices include catalytic converters and diesel particulate traps.

A catalytic converter for treating exhaust gases of an automotive engine includes a housing, a fragile catalyst support structure for holding the catalyst that is used to effect the oxidation of carbon monoxide and hydrocarbons and the reduction of oxides of nitrogen, and a mounting mat disposed between the outer surface of the fragile catalyst support structure and the inner surface of the housing to resiliently hold the fragile catalyst support structure within the housing.

A diesel particulate trap for controlling pollution generated by diesel engines generally includes a housing, a fragile particulate filter or trap for collecting particulate from the diesel engine emissions, and a mounting mat that is disposed between the outer surface of the filter or trap and the inner surface of the housing to resiliently hold the fragile filter or trap structure within the housing.

Provided is a mounting mat for an exhaust gas treatment device comprising a layer of high silica content fibers and a layer of polycrystalline and/or high alumina inorganic fibers.

Also provided is a method of making a mat structure comprising joining together a layer of high silica content fibers and a layer of polycrystalline and/or high alumina fibers.

Also provided is an exhaust gas treatment device comprising a housing, a fragile structure mounted within said housing, and a mounting mat disposed in a gap between said housing and said fragile structure, wherein said mounting mat comprises a layer of high silica content fibers and a layer of polycrystalline and/or high alumina fibers.

Also provided is a method of making a device for treating exhaust gases comprising providing a mounting mat comprising a layer of high silica content fibers and a layer of polycrystalline and/or high alumina inorganic fibers, wrapping the mounting mat around at least a portion of the perimeter of a fragile structure adapted for treating exhaust gases, and disposing the fragile structure and the mounting mat within a housing.

Additionally provided is an exhaust gas treatment device comprising a housing, a fragile structure mounted within the housing, and a mounting mat disposed in a gap between said housing and said fragile structure, a double walled end cone housing comprising inner and outer cone housings, and an insulation mat disposed between the walls of said end cone housing, said insulation mat comprising a layer of high silica content fibers and a layer of polycrystalline and/or high alumina inorganic fibers.

Further provided is an end cone for an exhaust gas treatment device comprising an outer metallic cone, an inner metallic cone, and an insulation mat disposed between said inner and outer metallic cones of the end cone housing, said insulation mat comprising a layer of high silica content fibers and a layer of polycrystalline and/or high alumina inorganic fibers.

FIG. 1 shows a fragmentary view of an illustrative exhaust gas treatment device including the inventive mounting mat.

A device for treating exhaust gases is provided having a fragile structure mounted within a housing that is supported therein by a mounting mat disposed between the housing and the fragile structure. It will be understood that the present invention is not intended to be limited to use in the catalytic converter shown in the Figure, and so the shape is shown only as an example to illustrate the invention. In fact, the mounting mat could be used to mount or support any fragile structure suitable for treating exhaust gases, such as a diesel catalyst structure, a diesel particulate trap or the like. Catalyst structures generally include one or more porous tubular or honeycomb-like structures mounted by a thermally resistant material within a housing. Each structure may include anywhere from about 200 to about 900 or more channels or cells per square inch, depending upon the type of exhaust treating device. A diesel particulate trap differs from a catalyst structure in that each channel or cell within the particulate trap is closed at one end or the other. Particulate is collected from exhaust gases in the porous structure until regenerated by a high temperature burnout process. Non-automotive applications for the mounting mat of the present invention may include catalytic converters for chemical industry emission (exhaust) stacks. The term "fragile structure" is intended to mean and include structures such as metal or ceramic monoliths or the like which may be fragile or frangible in nature, and would benefit from a mounting mat such as is described herein.

One representative form of a device for treating exhaust gases is shown as a catalytic converter, generally designated by the numeral 10 in the Figure. Catalytic converter 10 may include a generally tubular housing 12 formed of two pieces of metal, e.g. high temperature resistant steel, held together by flange 16. Alternatively, the housing may include a preformed canister into which a mounting mat-wrapped catalyst support structure is inserted. Housing 12 includes an inlet 14 at one end and an outlet (not shown) at its opposite end. The inlet 14 and outlet are suitably formed at their outer ends whereby they may be secured to conduits in the exhaust system of an internal combustion engine. Device 10 contains a fragile catalyst support structure, such as a frangible ceramic monolith 18, which is supported and restrained within housing 12 by a mounting mat 20, to be further described. Monolith 18 includes a plurality of gas pervious passages that extend axially from its inlet end surface at one end to its outlet end surface at its opposite end. Monolith 18 may be constructed of any suitable refractory metal or ceramic material in any known manner and configuration. Monoliths are typically oval or round in cross-sectional configuration, but other shapes are possible.

The monolith is spaced from its housing by a distance or a gap, which will vary according to the type and design of the device utilized, e.g., a catalytic converter, a diesel catalyst structure, or a diesel particulate trap. This gap is filled with a mounting mat 20 to provide resilient support to the ceramic monolith 18. The resilient mounting mat 20 provides both thermal insulation to the external environment and mechanical support to the catalyst support structure, protecting the fragile structure from mechanical shock.

In certain embodiments, the mounting mat 20 comprises one or more non-intumescent plies of melt-formed, amorphous, high-temperature resistant leached glass fibers having a high silica content and, optionally, includes a binder or other fibers suitable for acting as a binder. By the term "high silica content," it is meant that the fibers contain more silica than any other compositional ingredient in the fibers. In fact, as discussed below, it will be appreciated that the silica content of these fibers after leaching are preferably greater than any other glass fibers containing silica, including S-glass fibers, except crystalline quartz derived fibers or pure silica fibers.

One layer of the mounting mat may comprise an integral, substantially non-expanding composite sheet or sheets of melt-formed leached glass fibers containing silica and optionally minor amounts of alumina and other non-siliceous oxides. By "melt-formed," it is meant that the fibers are created using melt processing techniques and are not formed from sol gel or other chemical dispersion techniques. By "integral," it is meant that, after manufacture and densification, the mounting mat has a self-supporting structure, needing no reinforcing or containment layers of fabric, plastic or paper, (including those which are stitch-bonded to the mat) and can be handled or manipulated without disintegration.

The melt-formed glass fibers are preferably treated to increase the silica content of the fibers. That is, when first melt processed and formed into fibers such as by melt drawing the fibers, these glass fibers typically include many non-siliceous oxides and other components. That is, they may have the characteristics of fiberglass, for example. They are not initially formed from pure silica fibers like the crystalline quartz derived fibers disclosed in U.S. Pat. Nos. 5,290,522 or 5,380,580. Instead, these "impure" glass fibers must be treated to remove the non-siliceous oxides such as alumina, sodium oxide, boron oxide, and any other water or acid soluble components present, thereby producing fibers of high silica content that is greater than the silica content of the glass fibers prior to being treated. The silica content of a resultant leached glass fiber depends upon the amount of non-siliceous oxides and other components initially present and the degree of extraction of these materials from the fibers.

Leaching is one preferred treatment for the glass fibers that will increase the silica content of the fibers. Glass fibers may be leached in any manner and using any techniques known in the art. Generally, leaching may be accomplished by subjecting the melt formed glass fibers to an acid solution or other solution suitable for extracting the non-siliceous oxides and other components from the fibers. As previously noted, a more detailed description of various known leaching techniques are discussed in U.S. Pat. No. 2,624,658 and European Patent Application Publication No. 0973697, although these techniques are not limited to them.

The silica purity after leaching these glass fibers is much higher than prior to leaching. Generally, the leached glass fibers will have a silica content of at least 67 percent by weight. This is greater than the silica content of S-glass. According to certain embodiments, the leached glass fibers contain at least 90 percent by weight, or from about 90 percent by weight to less than 99 percent by weight silica. It will be appreciated that the high silica content of these fibers is greater than the known purity of any other known glass fibers containing silica, including S-glass fibers, except quartz fibers or pure silica fibers which contain greater than 99.9 percent silica.

In certain embodiments, the glass fibers will contain from about 93 to about 95 percent by weight silica, with the remainder of the fiber being non-siliceous oxides such as alumina, sodium oxide, and oxides of other alkali or alkaline earth metals. Amounts of alumina may range from about 4 to about 6 percent by weight, while other ceramic oxides and components, including sodium oxides, generally comprise less than about 1 percent by weight of the leached glass fiber. In certain embodiments, the leached glass fibers contain less than 1 percent by weight alkali or alkaline earth metals. It will be understood that not all of the non-siliceous oxides need be removed from the leached glass fibers. However, the leached glass fibers require a silica content in excess of the alumina content and, more preferably, in excess of at least about 67 percent by weight. The fibers are also substantially shot free.

The leached glass fibers are relatively inexpensive as compared to ceramic fibers such as high alumina fibers and particularly the above described crystalline quartz derived fibers. The average fiber diameter of these leached glass fibers is preferably greater than at least about 3.5 microns, and more preferably, greater than at least about 5 microns. On average, the glass fibers typically have a diameter of about 9 microns. An average fiber diameter of from about 5 to 14 microns is preferred. Thus, the leached glass fibers are non-respirable.

The leached glass fibers may be provided in any form commonly used in the production of mounting mats. In certain embodiments, these fibers are chopped tow fibers. Prior to leaching, it will be appreciated that the fibers can be produced by any method known in the art, but are typically formed using known melt processing techniques such as either by melt spinning or melt drawing in a manner which will provide a cost effective approach to the production of the fibers. In certain embodiments, the glass fibers are melt drawn.

Examples of leached glass fibers high in silica content and suitable for use in the production of a mounting mat for a catalytic converter or other known gas-treating device include those leached glass fibers available from BelChem Fiber Materials GmbH, Germany, under the trademark BELCOTEX and from Hitco Carbon Composites, Inc. of Gardena Calif., under the registered trademark REFRASIL. The BELCOTEX fibers are standard type, staple fiber pre-yarns. These fibers have an average fineness of about 550 tex and are generally made from silicic acid modified by alumina. The BELCOTEX fibers generally contain about 94.5 silica, about 4.5 percent alumina, less than 0.5 percent sodium oxide, and less than 0.5 percent of other components. They have an average fiber diameter of about 9 microns and a melting point in the range of 1500 to 1550° C. These fibers are heat resistant to temperatures of up to 1100° C., and are typically shot free and binder free.

The REFRASIL fibers, like the BELCOTEX fibers, are amorphous leached glass fibers high in silica content for providing thermal insulation for applications in the 1000 to 1100° C. range. These fibers are between about 6 and about 13 microns in diameter, and have a melting point of about 1700° C. The fibers, after leaching, typically have a silica content of about 95 percent by weight. Alumina is present in an amount of about 4 percent by weight with other components being present in an amount of 1 percent or less.

Heat treating the high silica content fibers may impart higher holding pressure performance, particularly with respect to high temperature applications, although higher holding pressure is also achieved for lower temperature applications as well. In one particular embodiment, these leached glass fibers (or the mounting mats containing them) may be heat treated at temperatures ranging from above at least about 900° C., preferably from about 900° C. to about 1100° C., such that the mounting mat employing these fibers may exert the minimum required holding pressure within the exhaust gas treatment device, even after 1000 cycles of expansion and contraction.

Heat treatment of the leached glass fibers may take place prior to formation of the mounting mat or after formation of the mounting mat. When heat treated after formation of the mounting mat, the mounting mat is heat treated at a temperature of at least 900° C. for an effective period of time to meet or exceed the desired effective minimum holding pressure for holding the fragile structure within the housing for the application. Similarly, when heat treated prior to formation of the mounting mat, the leached glass fibers may preferably be heated to a temperature of at least 900° C. for an effective period of time such that, when formed into the mounting mat, the minimum holding pressure for holding the fragile structure within the housing is met. The particular amount of time for heat treating may vary widely depending upon, among other things, the thickness of the mat, the uniformity of the heating, type of heating source used, the ramp up time and temperature of the heating source, etc. All of these variables are well understood by those skilled in the art, so an effective period of time for heating at a temperature of 900° C. or above may be readily determined without undue experimentation.

Generally, it has been recognized that heat treatment may take anywhere from 15 minutes or less, where relatively small, thin mats and excellent and uniform heat sources are used, to more than 1 hour where larger, thicker mats are employed (not including temperature ramp up and ramp down time). In certain embodiments, the mounting mat or leached glass fibers are heated at a temperature of between about 900° C. and 1100° C. for greater than 1 hour. It will further be appreciated that heat treatment may alternatively be conducted by subjecting the leached glass fibers and/or mounting mats made therefrom to lower heating temperatures, such as 300° C. However, the length of time necessary for obtaining a satisfactory mounting mat having the desired effective holding pressure is seen as commercially infeasible if the heat treatment takes longer than 24 hours. Heat treating under any time and temperature regimen below the time and/or temperature resulting in devitrification of the fibers, to achieve the same beneficial effects outlined above, would fall within the scope of the invention. Generally, the fibers or mat may be heat treated at or above the intended use temperature. It is noted that heat treating at lower temperatures may affect the usefulness of the mounting mat in applications requiring thermal cycling at temperatures substantially above the heat treatment temperature.

A layer of the mounting mat may employ up to 100 percent by weight of high silica content fibers, such as leached glass fibers containing silica. However, in other embodiments, the layer may optionally comprise other known fibers such as alumina/silica fibers, or other ceramic or glass fibers suitable for use in the production of mounting mats for the particular temperature applications desired. Thus, alumina/silica fibers such as refractory ceramic fibers may be optionally employed for high temperature or wide ranging temperature applications. Other ceramic or glass fibers such as S-glass may be used with the leached glass silica fibers in similar or lower temperature applications. In such instances, however, the mounting mat preferably includes at least 50 percent by weight of leached glass fibers containing silica. In other words, the majority of the fiber utilized in the production of the mat will be leached glass fibers containing silica, and in a more preferred embodiment, at least 80 percent by weight of the fibers will be leached glass fibers containing silica.

In certain alternative embodiments, fibers such as S2-glass and the like may be added to the mounting mat in quantities of from greater than 0 to about 50 percent by weight, based upon 100 percent by weight of the total mat. It is envisioned that these glass fibers will be used mainly in low temperature applications due to their melting temperatures and the like.

In other alternative embodiments, the mounting mat may include refractory ceramic fibers in addition to the leached glass fibers. When refractory ceramic fibers, that is, alumina/silica fibers or the like are utilized, they may be present in an amount ranging from greater than 0 to less than about 50 percent by weight, based upon 100 percent by weight of the total mat.

The mounting mat also includes a layer of polycrystalline and/or high alumina fibers. Polycrystalline and/or high alumina fibers may include sol-gel derived fibers. Sol-gel derived fibers are made by dissolving oxide precursors in liquid and spinning to form a fiber. The spun fiber is dried and calcined to form the final oxide fiber. The spinning step may be accomplished via centrifugal spinning, drawing, blowing, tack-spinning, extrusion of the liquid through a spinneret or suitable combinations thereof. U.S. Pat. Nos. 4,159,205 and 4,277,269 discuss various methods of making sol-gel derived fibers. Suitable sol-gel derived fibers include, without limitation, alumina fibers, high alumina fibers and mullite fibers. In certain embodiments, alumina fibers may comprise at least about 60% by weight alumina. In certain embodiments, high alumina fibers may comprise at least about 70% by weight alumina, in some embodiments at least about 95% by weight alumina, the remainder typically being silica, but perhaps additional oxides. In certain embodiments, mullite fibers may comprise about 72% by weight alumina and about 28% by weight silica, optionally with additional oxides present in small amounts.

In certain embodiments, the layer of polycrystalline and/or high alumina fibers is positioned adjacent to the substrate of the exhaust gas treatment device, which is referred to as the "hot side" of the mounting mat. By placing the polycrystalline and/or high alumina fiber layer of the present mounting mat on the hot side of the mounting mat, which may experience temperature of about 700° C. to about 1100° C., performance substantially similar to mounting mats which are 100% polycrystalline and/or high alumina fiber can be achieved. As installed, only the hot side of a mounting mat will experience very high temperatures (such as up to about 1100° C.) to which polycrystalline and/or high alumina fibers are especially suited. Therefore, replacing some of the fibers in a mounting mat which do not experience these very high temperatures with less expensive fibers, such as high silica content fibers, will reduce the cost of the mounting mat without sacrificing performance. The "cold side" of the mounting mat may experience temperatures of up to about 600° C.

As noted previously, the mounting mats may or may not include a binder. When a binder is used, the components are mixed to form a mixture or slurry. The slurry of fibers and binder is then formed into a mat structure and the binder is removed, thereby providing a mounting mat containing substantially only the heat-treated fibers (and optionally additional fibers). Typically, a sacrificial binder is employed to initially bond the fibers together. The binders used are typically organic binders. By "sacrificial," it is meant that the binder will eventually be burned out of the mounting mat, leaving only the leached glass fibers (and other ceramic or glass fibers, if used) as the mounting mat for supporting the fragile structure.

Suitable binders include aqueous and nonaqueous binders, but preferably the binder utilized is a reactive, thermally setting latex, which after cure is a flexible material that can be burned out of an installed mounting mat as indicated above. Examples of suitable binders or resins include, but are not limited to, aqueous based latexes of acrylics, styrene-butadiene, vinylpyridine, acrylonitrile, vinyl chloride, polyurethane and the like. Other resins include low temperature, flexible thermosetting resins such as unsaturated polyesters, epoxy resins and polyvinyl esters. Preferably, about 5 to about 10 percent latex is employed, with about 8 percent being most preferred. Solvents for the binders can include water, or a suitable organic solvent, such as acetone, for the binder utilized. Solution strength of the binder in the solvent (if used) can be determined by conventional methods based on the binder loading desired and the workability of the binder system (viscosity, solids content, etc.).

Instead of binder, the mat may include other fibers in addition to the fibers to hold the mat together. These fibers may be used in amounts ranging from greater than 0 to about 20 percent by weight, based upon 100 percent by weight of the total composition, to aid in binding the leached glass fibers together.

The layers of the mounting mat can be prepared by any known techniques commonly used in the preparation of mounting mats. For instance, using a papermaking process, the fibers may be mixed with a binder or other fibers capable of acting as a binder to form a mixture or slurry. Any mixing means may be used, but preferably, when a binder is used, the fibrous components are mixed at about a 0.25% to 5% consistency or solids content (0.25-5 parts solids to 99.75-95 parts water). The slurry may then be diluted with water to enhance formation, and it may finally be flocculated with a flocculating agent and drainage retention aid chemicals. Then, the flocculated mixture or slurry may be placed onto a papermaking machine to be formed into a ply of fiber containing paper. Alternatively, the plies may be formed by vacuum casting the slurry. In either case, they are typically dried in ovens. For a more detailed description of the standard papermaking techniques employed, see U.S. Pat. No. 3,458,329, the disclosure of which is incorporated herein by reference. It will be appreciated that when a binder is employed and the leached glass fibers are to be heat treated, the step of heat treating the fibers should be performed prior to adding the binder or binding fibers to the leached glass fibers.

In other embodiments, the fibers may be processed into a mat by conventional means such as dry air laying. The mat at this stage has very little structural integrity and is very thick relative to conventional catalytic converter and diesel trap mounting mats. The resultant mat can therefore be dry needled, as is commonly known in the art, to densify the mat and increase its strength. Heat treatment of the fibers may occur prior to formation of the mat or after the mat is needled.

Where the dry air layering technique is used, the mat may be alternatively processed by the addition of a binder to the mat by impregnation to form a discontinuous fiber composite. In this technique, the binder is added after formation of the mat, rather than forming the mat prepreg as noted hereinabove with respect to the conventional papermaking technique. This method of preparing the mat aids in maintaining fiber length by reducing breakage. It will be appreciated, however, that heat treatment, may occur prior to addition of any binder.

Methods of impregnation of the mat with the binder include complete submersion of the mat in a liquid binder system, or alternatively spraying the mat. In a continuous procedure, a fiber mat which can be transported in roll form, is unwound and moved, such as on a conveyer or scrim, past spray nozzles which apply the binder to the mat. Alternatively, the mat can be gravity-fed past the spray nozzles. The mat/binder prepreg is then passed between press rolls, which remove excess liquid and densify the prepreg to approximately its desired thickness. The densified prepreg may then be passed through an oven to remove any remaining solvent and if necessary to partially cure the binder to form a composite. The drying and curing temperature is primarily dependent upon the binder and solvent (if any) used. The composite can then either be cut or rolled for storage or transportation.

The mounting mat can also be made in a batch mode, by immersing a section of the mat in a liquid binder, removing the prepreg and pressing to remove excess liquid, thereafter drying to form the composite and storing or cutting to size The mounting mat may be prepared as a single integral mat having a layer of high silica content fibers and a layer of polycrystalline and/or high alumina inorganic fibers. According to alternative embodiments, the mounting mat may be prepared by joining together a layer sheet of high silica content fibers and a layer sheet of polycrystalline and/or high alumina fibers. The layer sheet of high silica content fibers and layer sheet of polycrystalline and/or high alumina fibers may be either adhesively bonded together or mechanically bonded together. The layer sheet of high silica content fibers and layer sheet of polycrystalline and/or high alumina inorganic fibers may be mechanically bonded together by needle-punching or hydroentangling the layer sheets together so that a portion of the fibers from one of the two layers are reoriented and extend at least partially through the thickness of the other layer.

In certain embodiments, the layer of high silica content fibers and the layer of polycrystalline and/or high alumina fibers may be brought into adjacent contact and then needled, in order to produce a single mounting mat with two layers. In certain embodiments, the individual layers may be needled separately prior to being needled together. In certain embodiments, the layers may be heat treated before or after being needled together into a single mounting mat.

Regardless of which of the above-described techniques are employed, the composite can be cut, such as by die stamping, to form mounting mats of exact shapes and sizes with reproducible tolerances. The mounting mat 20 exhibits suitable handling properties upon densification as by needling or the like, meaning it can be easily handled and is not so brittle as to crumble in one's hand like many other fiber blankets or mats. It can be easily and flexibly fitted or wrapped around the catalyst support structure 18 or like fragile structure without cracking, and then disposed within the catalytic converter housing 12. Generally, the mounting mat-wrapped fragile structure can be inserted into a housing or the housing can be built or otherwise fabricated around the mounting mat-wrapped fragile structure.

In operation, the catalytic converter experiences a significant change in temperature. Due to the differences in their thermal expansion coefficients, the housing may expand more than the support structure 18, such that the gap between these elements will increase slightly. The gap may expand and contract on the order of about 0.25 to about 1.5 mm during thermal cycling of the converter. The thickness and mounting density of the mounting mat is selected such that a minimum holding pressure of at least about 10 kPa is maintained under all conditions to prevent the fragile structure from vibrating loose. The mounting pressure exerted by the mounting mat 20 under these conditions permits accommodation of the thermal characteristics of the assembly without compromising the physical integrity of the constituent elements.

For mounting mats to be used in lower temperature applications, testing is conducted at about 300° C. However, the testing is conducted in the same manner as the high temperature test described. However, given the differences in load applications and the fact that heavier catalyst structures are often used, the minimum holding pressure must be higher. The mounting mat provides a holding pressure against the fragile structure of at least 50 kPa after 1000 cycles of testing at a hot face temperature of about 300° C.

The following examples are set forth merely to further illustrate the mounting mat and exhaust gas treatment device.

The illustrative examples should not be construed as limiting the mounting mat, exhaust gas treatment device incorporating the mounting mat, or the methods of making the mounting mat or the exhaust gas treatment device in any manner.

EXAMPLE 1

A mounting mat with a layer of high alumina fiber (PC-MAX® 2000i from Unifrax I LLC, Niagara Falls, N.Y.) and a layer of high silica content fiber was prepared as follows: A slurry of the high silica content fibers and water was casted and exposed to vacuum conditions in order to remove a significant portion of the water. The layer of high silica content fiber was then dried at 150° C. for 3-4 hours. A pre-prepared layer of PC-MAX® 2000i was placed into a needle punching machine, and the layer of high silica content fiber was placed on top of the PC-MAX 2000i layer. The two layers were needled together and heat treated at 900° C. for one hour.

The holding pressure performance of the mounting mat was tested at 1000° C. on the hot side and 400° C. on the cold side, with a 0.35 gap bulk density and a 4% gap expansion. A first test was performed with the high alumina fiber facing the hot side, and the minimum holding pressure of the mat after 1,000 cycles was 78.8 kPa. A second test was performed with the leach silica fiber facing the hot side, and the minimum holding pressure of the mat after 1,000 cycles was 43.4 kPa.

COMPARATIVE EXAMPLE 2

A mounting mat was prepared with only a single layer of high alumina fiber (PC-MAX® 2000i from Unifrax I LLC, Niagara Falls, N.Y.) and tested in the same manner as in Example 1. After 1,000 cycles, the minimum holding pressure of the mat was 85.9 kPa.

EXAMPLE 3

A mounting mat with a layer of high alumina fiber and a layer of high silica content fiber was prepared as follows: A slurry of the high silica content fibers and water was casted and exposed to vacuum conditions in order to remove a significant portion of the water. The layer of high silica content fiber was then dried at 150° C. for 3-4 hours. A layer of high alumina fibers was prepared in the same manner as the layer of high silica content fibers. The two layers were pressed together to form the layered mounting mat.

The holding pressure performance of the mounting mat was tested at 1000° C. on the hot side and 400° C. on the cold side, with a 0.35 gap bulk density and a 4% gap expansion. A first test was performed with the high alumina fiber facing the hot side, and the minimum holding pressure of the mat after 1,000 cycles was 41.1 kPa. A second test was performed with the leach silica fiber facing the hot side, and the minimum holding pressure of the mat after 1,000 cycles was 30.9 kPa.

COMPARATIVE EXAMPLE 4

A mounting mat was prepared with only a single layer of the same high alumina fiber as in Example 3, and tested in the same manner as in Example 3. After 1,000 cycles, the minimum holding pressure of the mat was 42.8 kPa.

These examples show that the subject mounting mat, which contains a layer of relatively more expensive polycrystalline and/or high alumina fibers and a layer of less expensive leached silica fibers performs similarly to a mounting mat containing only the same expensive polycrystalline and/or high alumina fibers, when the subject mounting mat is oriented such that the polycrystalline and/or high alumina fiber layer is adjacent to the hot side, or the substrate.

The mounting mats can be die cut and are operable as resilient supports in a thin profile, providing ease of handling, and in a flexible form, so as to be able to provide a total wrap of the catalyst support structure, if desired, without cracking Alternatively, the mounting mat may be integrally wrapped about the entire circumference or perimeter of at least a portion of the catalyst support structure. The mounting mat may also be partially wrapped and include an end-seal as currently used in some conventional converter devices, if desired, to prevent gas by-pass.

The mounting mats described above are also useful in a variety of applications such as conventional automotive catalytic converters for, among others, motorcycles and other small engine machines, and automotive preconverters, as well as high temperature spacers, gaskets, and even future generation automotive underbody catalytic converter systems. Generally, they can be used in any application requiring a mat or gasket to exert holding pressure at room temperature and, more importantly, to provide the ability to maintain the holding pressure at elevated temperatures of from about 20° C. to at least about 1100° C., including during thermal cycling.

The mounting mats described above can also be used in catalytic converters employed in the chemical industry which are located within exhaust or emission stacks, including those which contain fragile honeycomb type structures that need to be protectively mounted.

A first embodiment of the present subject matter includes a mounting mat for an exhaust gas treatment device comprising a layer of high silica content fibers and a layer of polycrystalline and/or high alumina fibers.

The mounting mat of the first embodiment may furthering include that said high silica content fibers are melt-formed silica fibers. Said melt-formed silica fibers may be leached. Said melt-formed and leached silica fibers may comprise at least 67 weight percent silica. Said melt-formed and leached silica fibers may be heat-treated.

The mounting mat of either or both of the first or subsequent embodiments may further include that said polycrystalline and/or high alumina fibers comprise sol-gel derived fibers. Said sol-gel derived fibers may comprise at least 60 weight percent alumina. Said sol-gel derived fibers may comprise at least at least 72 weight percent alumina. Said sol-gel derived fibers may comprise from about 72 to about 75 weight percent alumina and from about 25 to about 28 weight percent silica. Said sol-gel derived fibers may comprise at least 90 weight percent alumina.

The mounting mat of any of the first or subsequent embodiments may further include that the layer of high silica content fibers and layer of polycrystalline and/or high alumina fibers comprise an integral layer.

The mounting mat of any of the first or subsequent embodiments may further include that the layer of high silica content fibers and layer of polycrystalline and/or high alumina fibers are adhesively bonded together.

The mounting mat of any of the first or subsequent embodiments may further include that the layer of high silica content fibers and layer of polycrystalline and/or high alumina fibers are mechanically bonded together. The layer of high silica content fibers and layer of polycrystalline and/or high alumina fibers may be physically entangled.

A second embodiment of the present subject matter includes a method of making a mat structure comprising joining together a layer of high silica content fibers and a layer of polycrystalline and/or high alumina fibers.

The method of the second embodiment may further include that said joining comprises heat laminating said layer of high silica content fibers and said layer of polycrystalline and/or high alumina fibers together.

The method of either or both of the second or subsequent embodiments may further include that said joining comprises adhesively bonding said layer of high silica content fibers and said layer of polycrystalline and/or high alumina fibers together.

The method of any of the second or subsequent embodiments may further include that said joining comprises mechanically bonding said layer of high silica content fibers and said layer of polycrystalline and/or high alumina fibers together. Said mechanically bonding may comprise needle-punching said layer of high silica content fibers and said layer of polycrystalline and/or high alumina fibers together. Said mechanically bonding may comprise hydroentangling said layer of high silica content fibers and said layer of polycrystalline and/or high alumina fibers together.

The method of any of the second or subsequent embodiments may further include that said high silica content fibers are melt-formed silica fibers. Said melt-formed silica fibers may be leached. Said melt-formed and leached silica fibers may comprise at least 67 weight percent silica. Said melt-formed and leached silica fibers may be heat-treated.

The method of any of the second or subsequent embodiments may further include that said polycrystalline and/or high alumina fibers comprise sol-gel derived fibers. Said sol-gel derived fibers may comprise at least 60 weight percent alumina. Said sol-gel derived fibers may comprise at least at least 72 weight percent alumina. Said sol-gel derived fibers may comprise from about 72 to about 75 weight percent alumina and from about 25 to about 28 weight percent silica. Said sol-gel derived fibers may comprise at least 90 weight percent alumina.

A third embodiment of the present subject matter includes an exhaust gas treatment device comprising: a housing; a fragile structure mounted within said housing; and a mounting mat disposed in a gap between said housing and said fragile structure, wherein said mounting mat comprises a layer of high silica content fibers and a layer of polycrystalline and/or high alumina fibers.

The exhaust gas treatment device of the third embodiment may further include that said high silica content fibers are melt-formed silica fibers. Said melt-formed silica fibers may be leached. Said melt-formed and leached silica fibers may comprise at least 67 weight percent silica. Said melt-formed and leached silica fibers may be heat-treated.

The exhaust gas treatment device of either or both of the third or subsequent embodiments may further include that said polycrystalline and/or high alumina fibers comprise sol-gel derived fibers. Said sol-gel derived fibers may comprise at least 60 weight percent alumina. Said sol-gel derived fibers may comprise at least at least 72 weight percent alumina. Said sol-gel derived fibers may comprise from about 72 to about 75 weight percent alumina and from about 25 to about 28 weight percent silica. Said sol-gel derived fibers may comprise at least 90 weight percent alumina.

The exhaust gas treatment device of any of the third or subsequent embodiments may further include that the layer of high silica content fibers and layer of polycrystalline fibers comprise an integral layer.

The exhaust gas treatment device of any of the third or subsequent embodiments may further include that the layer of high silica content fibers and layer of polycrystalline fibers are adhesively bonded together.

The exhaust gas treatment device of any of the third or subsequent embodiments may further include that the layer of high silica content fibers and layer of polycrystalline fibers are mechanically bonded together. The layer of high silica content fibers and layer of polycrystalline fibers may be physically entangled.

A fourth embodiment of the present subject matter includes a method of making a device for treating exhaust gases comprising: providing a mounting mat comprising a layer of high silica content fibers and a layer of polycrystalline and/or high alumina fibers; wrapping the mounting mat around at least a portion of the perimeter of a fragile structure adapted for treating exhaust gases; and disposing the fragile structure and the mounting mat within a housing. The mounting mat may be the mounting may of any of the first or subsequent embodiments described above.

A fifth embodiment of the present subject matter includes an exhaust gas treatment device comprising: a housing; a fragile structure mounted within the housing; a mounting mat disposed in a gap between said housing and said fragile structure; a double walled end cone housing comprising inner and outer cone housings; and an insulation mat disposed between the walls of said end cone housing, said insulation mat comprising a layer of high silica content fibers and a layer of polycrystalline and/or high alumina fibers. The insulation may be the mounting mat of any of the first or subsequent embodiments described above.

A sixth embodiment of the present subject matter includes an end cone for an exhaust gas treatment device comprising: an outer metallic cone; an inner metallic cone; and an insulation mat disposed between said inner and outer metallic cones of the end cone housing, said insulation mat comprising a layer of high silica content fibers and a layer of polycrystalline and/or high alumina fibers. The insulation may be the mounting mat of any of the first or subsequent embodiments described above.

The mounting mat, end cone, exhaust gas treatment device, and related methods not limited to the specific embodiments described above, but includes variations, modifications and equivalent embodiments defined by the following claims. The embodiments described above are not necessarily in the alternative, as various embodiments may be combined to provide the desired characteristics.

I claim:

1. A mounting mat for an exhaust gas treatment device comprising a non-intumescent layer of high silica content fibers adjacent a layer of at least one of polycrystalline fibers and high alumina fibers.

2. The mounting mat of claim 1 wherein said high silica content fibers are melt-formed silica fibers.

3. The mounting mat of claim 2, wherein said melt-formed silica fibers are leached.

4. The mounting mat of claim 3, wherein said melt-formed and leached silica fibers comprise at least 67 weight percent silica.

5. The mounting mat of claim 4, wherein said melt-formed and leached silica fibers are heat-treated.

6. The mounting mat of claim 1, wherein said polycrystalline and/or high alumina fibers comprise sol-gel derived fibers.

7. The mounting mat of claim 6, wherein said sol-gel derived fibers comprise at least 60 weight percent alumina.

8. The mounting mat of claim 7, wherein said sol-gel derived fibers comprise at least at least 72 weight percent alumina.

9. The mounting mat of claim 8, wherein said sol-gel derived fibers comprise from about 72 to about 75 weight percent alumina and from about 25 to about 28 weight percent silica.

10. The mounting mat of claim 7, wherein said sol-gel derived fibers comprise at least 90 weight percent alumina.

11. The mounting mat of claim 1, wherein the layer of high silica content fibers and layer of polycrystalline and/or high alumina fibers comprise an integral layer.

12. The mounting mat of claim 1, wherein the layer of high silica content fibers and layer of polycrystalline and/or high alumina fibers are adhesively bonded together.

13. The mounting mat of claim 1, wherein the layer of high silica content fibers and layer of polycrystalline and/or high alumina fibers are mechanically bonded together.

14. The mounting mat of claim 13, wherein the layer of high silica content fibers and layer of polycrystalline and/or high alumina fibers are physically entangled.

15. A method of making a mounting mat for an exhaust gas treatment device comprising joining together in adjacent contact a non-intumescent layer of high silica content fibers and a layer of at least one of polycrystalline fibers and high alumina fibers.

16. The method of making a mounting mat of claim 15, wherein said joining comprises heat laminating said layer of non-intumescent high silica content fibers and said layer of at least one of polycrystalline fibers and high alumina fibers together.

17. The method of making a mounting mat of claim 15, wherein said joining comprises adhesively bonding said layer of non-intumescent high silica content fibers and said layer of at least one of polycrystalline fibers and high alumina fibers together.

18. The method of making a mounting mat of claim 15, wherein said joining comprises mechanically bonding said layer of non-intumescent high silica content fibers and said layer of at least one of polycrystalline fibers and high alumina fibers together.

19. The method of making a mounting mat of claim 18, wherein said mechanically bonding comprises needle-punching said layer of non-intumescent high silica content fibers and said layer of at least one of polycrystalline fibers and high alumina fibers together.

20. The method of making a mounting mat of claim 18, wherein said mechanically bonding comprises hydroentangling said layer of non-intumescent high silica content fibers and said layer of at least one of polycrystalline fibers and high alumina fibers together.

21. The method of making a mounting mat of claim 15, wherein said high silica content fibers are melt-formed silica fibers.

22. The method of making a mounting mat of claim 21, wherein said melt-formed silica fibers are leached.

23. The method of making a mounting mat of claim 22, wherein said melt-formed and leached silica fibers comprise at least 67 weight percent silica.

24. The method of making a mounting mat of claim 23, wherein said melt-formed and leached silica fibers are heat-treated.

25. The method of making a mounting mat of claim 15, wherein said polycrystalline and/or high alumina fibers comprise sol-gel derived fibers.

26. The method of making a mounting mat of claim 25, wherein said sol-gel derived fibers comprise at least 60 weight percent alumina.

27. The method of making a mounting mat of claim 26, wherein said sol-gel derived fibers comprise at least at least 72 weight percent alumina.

28. The method of making a mounting mat of claim 27, wherein said sol-gel derived fibers comprise from about 72 to about 75 weight percent alumina and from about 25 to about 28 weight percent silica.

29. The method of making a mounting mat of claim 26, wherein said sol-gel derived fibers comprise at least 90 weight percent alumina.

30. An exhaust gas treatment device comprising:
a housing;
a fragile structure mounted within said housing; and
a mounting mat disposed in a gap between said housing and said fragile structure, wherein said mounting mat comprises a non-intumescent layer of high silica content fibers adjacent a layer of at least one of polycrystalline fibers and high alumina fibers, and wherein said layer of high silica content fibers is adjacent said housing and wherein said layer of at least one of polycrystalline fibers and alumina fibers is adjacent said fragile structure.

31. The exhaust gas treatment device of claim 30, wherein said high silica content fibers are melt-formed silica fibers.

32. The exhaust gas treatment device of claim 31, wherein said melt-formed silica fibers are leached.

33. The exhaust gas treatment device of claim 32, wherein said melt-formed and leached silica fibers comprise at least 67 weight percent silica.

34. The exhaust gas treatment device of claim 33, wherein said melt-formed and leached silica fibers are heat-treated.

35. The exhaust gas treatment device of claim 30, wherein said polycrystalline and/or high alumina fibers comprise sol-gel derived fibers.

36. The exhaust gas treatment device of claim 35, wherein said sol-gel derived fibers comprise at least 60 weight percent alumina.

37. The exhaust gas treatment device of claim 36, wherein said sol-gel derived fibers comprise at least at least 72 weight percent alumina.

38. The exhaust gas treatment device of claim 37, wherein said sol-gel derived fibers comprise from about 72 to about 75 weight percent alumina and from about 25 to about 28 weight percent silica.

39. The exhaust gas treatment device of claim 36, wherein said sol-gel derived fibers comprise at least 90 weight percent alumina.

40. The exhaust gas treatment device of claim 30, wherein the layer of high silica content fibers and layer of at least one of polycrystalline fibers and high alumina fibers comprise an integral layer.

41. The exhaust gas treatment device of claim 30, wherein the layer of high silica content fibers and layer of at least one of polycrystalline fibers and high alumina fibers are adhesively bonded together.

42. The exhaust gas treatment device of claim 30, wherein the layer of high silica content fibers and layer of at least one of polycrystalline fibers and high alumina fibers are mechanically bonded together.

43. The exhaust gas treatment device of claim 42, wherein the layer of high silica content fibers and layer of at least one of polycrystalline fibers and high alumina fibers are physically entangled.

44. A method of making a device for treating exhaust gases comprising:

providing a mounting mat comprising a layer of high silica content fibers adjacent a layer of at least one of polycrystalline fibers and high alumina fibers;

wrapping the mounting mat around at least a portion of the perimeter of a fragile structure adapted for treating exhaust gases, wherein said layer of high silica content fibers is adjacent said housing and wherein said layer of at least one of polycrystalline fibers and alumina fibers is adjacent said fragile structure; and disposing the fragile structure and the mounting mat within a housing.

* * * * *